Aug. 5, 1930.   W. VOGEL   1,772,120
JOURNAL FOR PULVERIZING ROLLERS
Filed Feb. 6, 1928   2 Sheets-Sheet 1
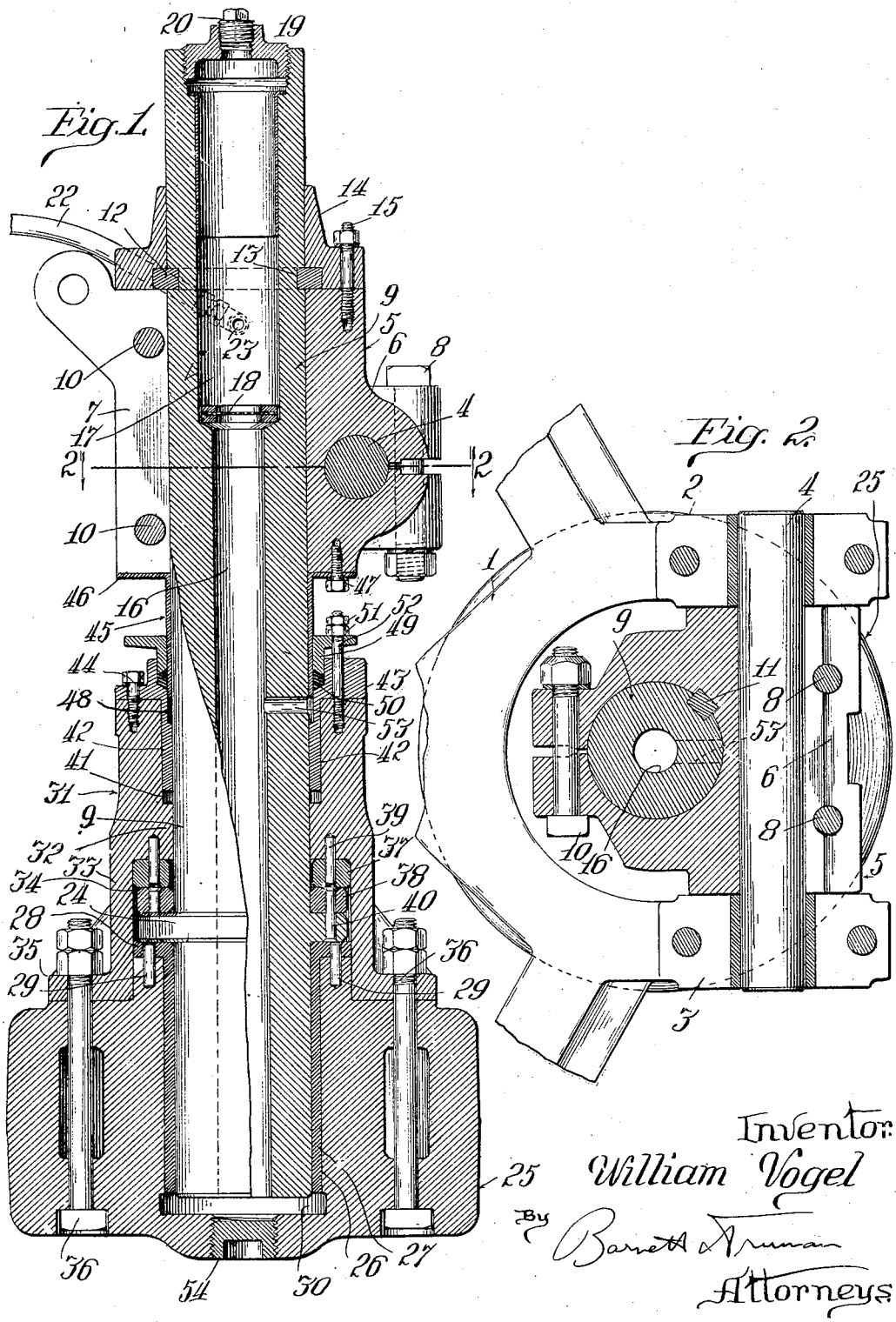
Inventor:
William Vogel
By Barrett & Truman
Attorneys

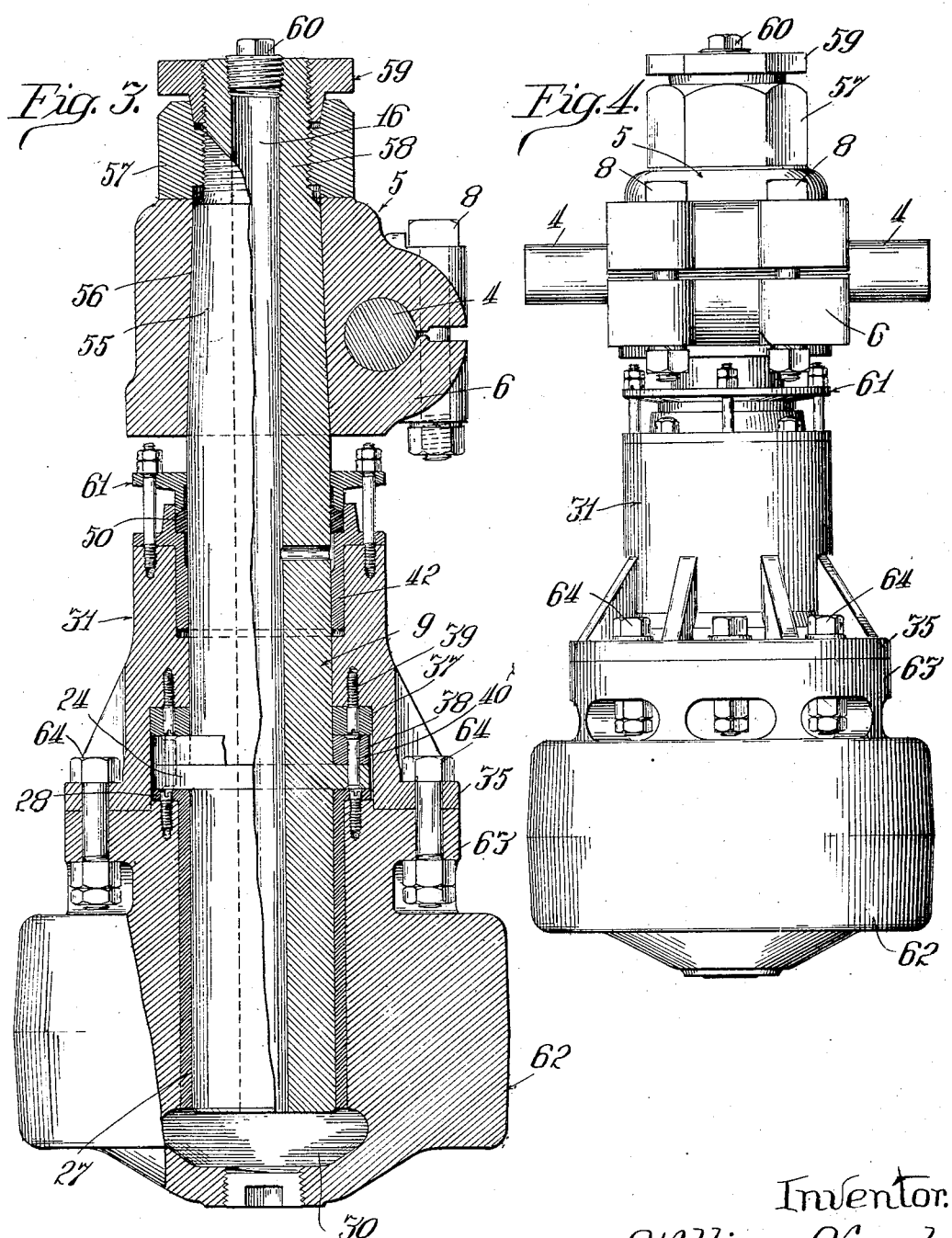

Patented Aug. 5, 1930

1,772,120

UNITED STATES PATENT OFFICE

WILLIAM VOGEL, OF HIGHLAND PARK, ILLINOIS, ASSIGNOR TO THE RAYMOND BROTHERS IMPACT PULVERIZER CO., OF CHICAGO, ILLINOIS, A CORPORATION OF ILLINOIS

JOURNAL FOR PULVERIZING ROLLERS

Application filed February 6, 1928. Serial No. 252,237.

This invention relates to improved means for rotatably supporting, and lubricating the bearings of, a pulverizing roller for a grinding or pulverizing mill of the general type shown, for example, in the patent to Raymond et al., 1,573,191, granted February 16, 1926. In a mill of this type, a plurality of pulverizing rollers are pivotally suspended in a circular series from a rotating frame or spider, the rollers swinging out by centrifugal force against the inner surface of a fixed circular bull ring, whereby the material caught between the ring and rollers is pulverized. The present invention relates to an improved form of journal support for one of these rollers, in combination with improved means for lubricating the bearings between the fixed supporting shaft and the rotatable assembly.

One object of this invention is to provide improved means for rotatably mounting and supporting a pulverizing roller from a non-rotatable shaft suspended in a substantially upright position.

Another object is to provide improved sealing means for preventing the excessive escape of oil or other lubricant between the non-rotating supporting shaft and the rotating assembly.

Another object is to provide improved means for maintaining an upward flow of oil through the several bearings between the rotatable assembly and the supporting shaft.

Other objects and advantages of this invention will be more apparent from the following detailed description of certain approved forms of apparatus involving the principles of the invention.

In the accompanying drawings:

Fig. 1 is a central vertical section through one approved form of the assembled apparatus.

Fig. 2 is an enlarged horizontal section taken substantially on the line 2—2 of Fig. 1.

Fig. 3 is a view, similar to Fig. 1, showing a modification.

Fig. 4 is an elevation, on a somewhat smaller scale, of the form of roller shown in Fig. 3.

At 1 is shown a portion of the rotating spider of the roller mill, on which is formed a yoke comprising the parallel arms 2 and 3, in which are pivotally mounted the ends of the trunnion shaft 4. The rocker 5 comprises two split collars positioned at right angles to one another, the collar 6 being clamped about the trunnion shaft 4 by means of bolts 8 and the collar 7 being clamped about the upper portion of roller-supporting shaft 9 by means of bolts 10. A key 11 fitting mating grooves or recesses in the collar 7 and shaft 9 prevents relative rotation between the shaft 9 and the rocker 5. A split ring 12 is adapted to fit partially within an annular groove 13 in shaft 9, the projecting portion of ring 12 resting against the upper surface of the rocker 5. A collar 14 which surrounds the shaft 9 and is secured to the upper end of rocker 5 by bolts 15, fits over the projecting portion of ring 12, whereby longitudinal movement of shaft 9 through the rocker 5 in either direction is prevented.

A passage 16 for oil or other lubricant extends axially throughout the length of shaft 9, the upper portion of this passage being enlarged at 17 to form a lubricant reservoir, at the lower end of which is placed the oil-screen 18. The upper end of chamber 17 is closed by the screw plug 19, in which is placed a smaller plug 20 which may be removed for the insertion of lubricant. In Fig. 1 we have indicated a flexible conduit 22, the end of which is connected at 23 with a passage tapped into one side of the reservoir 17, whereby a central lubricating system may be utilized for feeding oil to all of the individual rollers of the mill. A central lubricating system adapted especially for this purpose is disclosed and claimed in the copending application of Crites, Serial No. 252,223, filed February 6, 1928.

An outwardly projecting roller-supporting collar 24 is formed on shaft 9 at a point intermediate its length, in the example here shown this collar being positioned nearer the lower end of the shaft than the upper end. The pulverizing roller 25 is hollowed out at 26 to surround the lower end portion of shaft 9, and in this chamber 26 is secured the bushing 27 adapted to rotatably engage the shaft. An outwardly projecting flange 28 at the upper end of bushing 27 overlaps the upper surface of roller 25 and is secured thereto by pins 29. The upper surface of flange 28 is adapted to engage the lower surface of collar 24, the cavity 26 within the roller 25 extending beneath the lower end of shaft 9 at this time to form a lubricant receiving well 30.

The supporting sleeve or housing 31 has an intermediate portion 32 fitting about the shaft 9, from which the skirt 33 projects downwardly in spaced relation to the shaft to provide an annular chamber 34 above the collar 24. The outwardly projecting flange 35 at the bottom of skirt 33 engages the upper surface of pulverizing roller 25 and is secured thereto by means of a series of bolts 36, whereby the roller is suspended from the housing 31. A pair of thrust rings 37, 38, which carry the load, are positioned in the annular chamber 34, the ring 37 being secured by pins 39 to the housing 31, and the ring 38 being secured by pins 40 to the upper surface of collar 24.

The upper end of sleeve or housing 31 is hollowed out at 41 to receive the bushing sleeve 42 which has an enlarged head 43 secured to the upper end of sleeve 31 by a series of screw bolts 44. A sleeve or bushing 45 of chromium plated metal surrounds the shaft 9 and has an outwardly projecting flange 46 at its upper end secured by screw bolts 47 to the lower surface of rocker 5. The lower end of sleeve or bushing 45 projects partially into a correspondingly shaped annular recess 48 in the bushing 42. An annular gland 49 projects into a correspondingly shaped recess in the head 43 of bushing 42 to engage a packing ring 50. By adjusting the nuts 51 on a series of screw bolts 52, the gland 49 may be forced down to expand the packing ring 50 and force same into sealing engagement with the bushing 45 on the non-rotatable shaft 9. The hard sleeve 45 protects shaft 9 from the wear of the gasket 50 and gland 49. Sleeve 45 may be replaced when worn, but will last for a long period of time. It will be noted that the lower end of sleeve 45 does not project to the bottom of annular space 48 in bushing 42, so that an annular oil collecting chamber remains beneath the sealing ring 50, this space being connected by a radial passage 53 with the lubricant conduit 16 in the shaft 9. It will be noted that the passage 53 is positioned on the outer side of shaft 9, that is the side away from the center about which the spider 1 rotates whereby centrifugal force will tend to cause oil to flow out through passage 53 into the annular channel 48.

A screw plug 54 in the bottom of the roller 25 permits access, if desired, to the lubricant well 30.

In operation, the oil or other lubricant in reservoir 17 and conduit or passage 16 will flow down into the well 30, and thence will work its way up along the bearing surface between bushing 27 and shaft 9. This upward movement of the oil film around the shaft 9 is caused partly by the pressure of the head of oil in conduit 16, partly by the centrifugal action of the oil in well 30, and is perhaps aided by capillary action. This oil film will travel up around the collar 24 between the thrust rings 37 and 38, and up between shaft 9 and bushing 42 into the annular oil collecting chamber 48. A very small amount of this oil will escape past the sealing gasket 50 and gland 49. The object of this sealing means is to prevent the excessive loss of oil or other lubricant, but it is desirable that there be a slight out-flow of oil in order to prevent excessive wear of the gasket and gland and to combat the entrance of dust through this joint.

When the roller is at rest, the head of oil in passage 16 will cause an outward flow through passage 53 to initially lubricate the sealing means and bushing 42. After the roller is in operation the upward flow of oil outside the shaft will tend to counteract the outward flow through passage 53, so that there will ordinarily be no material movement of oil through this passage.

The modification shown in Figs. 3 and 4 differs only in certain details from the preferred form already described, those features which are common to both modifications not being further alluded to. In this case, the split collar 7 of rocker 5 is omitted, and the upper end of shaft 9 is formed with a tapered portion 55 adapted to be drawn up tightly into a correspondingly tapered opening 56 in the rocker 5, by means of a nut 57 threaded onto the reduced upper end portion 58 of shaft 9. Lock nut 59 holds the parts in engagement. In this form of the invention the reservoir 17 has been omitted, the conduit 16 extending continuously throughout the length of the shaft and opening into the well 30 at its lower end and being closed by plug 60 at its upper end. In this simplified form of assembly the bushing 45 has been omitted, the gland 61 engaging directly with shaft 9 above the gasket 50. Instead of having the bolts 36 pass completely through the pulverizing roller, as shown in Fig. 1, the roller 62 is provided with an outwardly projecting flange 63 at its top, engaging beneath the flange 35 on sleeve 31, the flanges 35 and 63 being connected by a series of bolts 64 whereby the roller 62 is suspended.

I claim:

1. In an apparatus of the character described, a shaft, means in which the upper portion of the shaft is secured for suspending the shaft in a substantially upright position, the shaft having a lubricant passage extending substantially axially therethrough, there being an annular outwardly projecting collar on the shaft at a location intermediate its length, a roller formed to rotate on the lower portion of the shaft beneath the collar, there being a lubricant well formed in the roller below the lower end of the shaft, a supporting sleeve rotatable on the shaft above the collar, means for securing the roller to the sleeve, and a sealing means between the upper end of the sleeve and the shaft.

2. In an apparatus of the character described, a shaft, means in which the upper portion of the shaft is secured for suspending the shaft in a substantially upright position, the shaft having a lubricant passage extending substantially axially therethrough, there being an annular outwardly projecting collar on the shaft at a location intermediate its length, a roller formed to rotate on the lower portion of the shaft beneath the collar, there being a lubricant well in the roller below the lower end of the shaft, a supporting sleeve rotatable on the shaft above the collar, means for securing the roller to the sleeve, a sealing means between the upper end of the sleeve and the shaft, said sealing means comprising a bushing secured to the sleeve, a gland carried by the bushing and adjustable into the upper end thereof, and a gasket clamped between the gland and bushing, there being a lubricant duct extending from the outer surface of the shaft below the packing to the central lubricant passage.

3. In an apparatus of the character described, a shaft, means in which the upper portion of the shaft is secured for suspending the shaft in a substantially upright position, the shaft having a lubricant passage extending substantially axially therethrough, there being an annular outwardly projecting collar on the shaft at a location intermediate its length, a roller formed to rotate on the lower portion of the shaft beneath the collar, there being a lubricant well in the roller below the lower end of the shaft, a bushing secured in the roller and having a cylindrical portion engaging the shaft and an upper annular flange engaging the lower face of the collar, a supporting sleeve rotatable on the shaft above the collar, the sleeve having a skirt projecting downwardly about the collar and secured to the roller, a pair of thrust rings adapted to engage with one another and secured one to the upper surface of the collar and the other to the lower surface of the supporting sleeve, and a sealing means between the upper end of the sleeve and the shaft.

4. In an apparatus of the character described, a shaft, means in which the upper portion of the shaft is secured for suspending the shaft in a substantially upright position, the shaft having a lubricant passage extending substantially axially therethrough, there being an annular outwardly projecting collar on the shaft at a location intermediate its length, a roller formed to rotate on the lower portion of the shaft beneath the collar, there being a lubricant well in the roller below the lower end of the shaft, a bushing secured in the roller and having a cylindrical portion engaging the shaft and an upper annular flange engaging the lower face of the collar, a supporting sleeve rotatable on the shaft above the collar, the sleeve having a skirt projecting downwardly about the collar and secured to the roller, a pair of thrust rings adapted to engage with one another and secured one to the upper surface of the collar and the other to the lower surface of the supporting sleeve, a sealing means between the upper end of the sleeve and the shaft, said sealing means including a bushing mounted in the upper end of the sleeve, a gland telescopically fitted within an annular chamber in the upper portion of the bushing and a gasket confined between the gland and bushing, there being an annular chamber in the bushing beneath the gasket and a lubricant duct in the shaft connecting the central lubricant passage with this latter chamber.

5. In an apparatus of the character described, a shaft, means in which the upper portion of the shaft is secured for suspending the shaft in a substantially upright position, there being an annular outwardly projecting collar on the shaft at a location intermediate its length, a roller formed to enclose the lower end of the shaft beneath the collar and rotate about the shaft, a supporting sleeve rotatable on the shaft above the collar and supported by the collar, annular bearing means surrounding the shaft and interposed between the sleeve and collar, the sleeve having a downwardly projecting skirt terminating in an outwardly projecting flange, and means for securing the flange to the upper surface of the roller.

6. In an apparatus of the character described, a trunnion shaft, means in which the ends of the trunnion are pivotally supported, a rocker comprising two split collars positioned at right angles to one another, one of the collars being clamped about the trunnion shaft, a roller-supporting shaft the upper portion of which is clamped in the other collar, a ring secured in the upper portion of the shaft and engaging the upper surface of the rocker-collar in which the shaft is clamped, an annular member encircling the shaft above the ring and secured to the collar, a pulverizing roller, and means for rotatably supporting the roller upon the lower portion of the shaft.

7. In an apparatus of the character described, a shaft, a split housing, means for clamping the housing about the upper portion of the shaft, means for pivotally supporting the housing so that the shaft and housing are free to swing in a vertical plane, a projecting annular flange adjacent the upper end of the shaft and engaging the upper surface of the housing, an annular member encircling the shaft above the flange and secured to the housing, there being an outwardly projecting collar on the shaft at a location intermediate its length, a roller formed to rotate on the lower portion of the shaft beneath the collar, a supporting sleeve rotatable on the shaft above the collar, and means for suspending the roller from the sleeve.

8. In an apparatus of the character described, a shaft, a split housing, means for clamping the housing about the upper portion of the shaft, means for pivotally supporting the housing so that the shaft and housing are free to swing in a vertical plane, a projecting annular flange adjacent the upper end of the shaft and engaging the upper surface of the housing, an annular member encircling the shaft above the flange and secured to the housing, there being a lubricant cavity in the upper portion of the shaft and a lubricant passage extending substantially axially of the shaft from the cavity to the lower end of the shaft, an oil strainer in the cavity, there being an outwardly projecting collar on the shaft at a location intermediate its length, a roller formed to rotate on the lower portion of the shaft beneath the collar, there being a lubricant well formed in the roller below the lower end of the shaft, a supporting sleeve rotatable on the shaft above the collar, means for securing the roller to the sleeve, and a packing means between the upper end of the sleeve and the shaft.

9. In an apparatus of the character described, a shaft, a split housing, means for clamping the housing about the upper portion of the shaft, means for pivotally supporting the housing so that the shaft and housing are free to swing in a vertical plane, a projecting annular flange adjacent the upper end of the shaft and engaging the upper surface of the housing, an annular clamping member encircling the shaft above the flange and secured to the housing, there being a lubricant cavity in the upper portion of the shaft and a lubricant passage extending substantially axially of the shaft from the cavity to the lower end of the shaft, an oil strainer in the cavity, there being an outwardly projecting collar on the shaft at a location intermediate its length, a roller formed to rotate on the lower portion of the shaft beneath the collar, there being a lubricant well in the roller below the lower end of the shaft, a bushing secured in the roller and having a cylindrical portion engaging the shaft and an upper annular flange engaging the lower face of the collar, a supporting sleeve rotatable on the shaft above the collar, the sleeve having a skirt projecting downwardly about the collar, means for suspending the roller from this skirt, a pair of thrust rings adapted to engage with one another and secured one to the upper surface of the collar and the other to the lower surface of the supporting sleeve, and a packing means at the upper end of the sleeve comprising a bushing mounted in the upper end of the sleeve about the shaft, a gland telescopically fitting within an annular chamber in the upper portion of the bushing and a gasket confined between the gland and the bushing and engaging the shaft, there being an annular chamber in the bushing beneath the gasket and a lubricant duct in the shaft connecting the central lubricant passage with the latter chamber.

WILLIAM VOGEL.